United States Patent
Studer et al.

(10) Patent No.: US 7,632,906 B2
(45) Date of Patent: Dec. 15, 2009

(54) POLYMERIZABLE COPOLYMERS FOR ALIGNMENT LAYERS

(75) Inventors: Peggy Studer, Huningue (FR); Richard Stossel, Frenkendorf (CH); Patrick Scheifele, Therwil (CH); Yonetatsu Matsumoto, Kobe (JP)

(73) Assignee: Rolic AG, Zug (CH)

( * ) Notice: Subject to any disclaimer, the term of this patent is extended or adjusted under 35 U.S.C. 154(b) by 209 days.

(21) Appl. No.: 10/564,729

(22) PCT Filed: Jul. 8, 2004

(86) PCT No.: PCT/EP2004/051425

§ 371 (c)(1),
(2), (4) Date: Oct. 16, 2006

(87) PCT Pub. No.: WO2005/014677

PCT Pub. Date: Feb. 17, 2005

(65) Prior Publication Data

US 2007/0179266 A1    Aug. 2, 2007

(30) Foreign Application Priority Data

Jul. 16, 2003    (CH) .................... 1244/03

(51) Int. Cl.
*C08F 118/02*    (2006.01)

(52) U.S. Cl. .............. 526/329.6; 526/319; 526/320; 526/321; 526/326; 526/328.5; 526/329.2; 526/329.3; 526/329.4; 526/329.5

(58) Field of Classification Search ............. 526/319, 526/320, 321, 326, 328.5, 329.2, 329.3, 329.4, 526/329.5, 329.6

See application file for complete search history.

(56) References Cited

U.S. PATENT DOCUMENTS

| | | | |
|---|---|---|---|
| 3,453,110 A | | 7/1969 | Delzenne et al. |
| 5,385,808 A | | 1/1995 | Tokoh et al. |
| 5,539,074 A | | 7/1996 | Herr et al. |
| 5,998,496 A | | 12/1999 | Hassoon et al. |
| 6,107,427 A | * | 8/2000 | Herr et al. .................. 526/321 |
| 6,201,087 B1 | | 3/2001 | Herr et al. |
| 6,919,404 B2 | * | 7/2005 | Gibbons et al. ............ 525/180 |
| 2003/0039768 A1 | | 2/2003 | Buchecker et al. |

FOREIGN PATENT DOCUMENTS

| | | |
|---|---|---|
| EP | 0860455 A2 | 8/1998 |
| EP | 0763552 B1 | 9/2001 |
| WO | WO 96/10049 A1 | 4/1996 |
| WO | WO 01/53384 A1 | 7/2001 |

* cited by examiner

*Primary Examiner*—Helen L. Pezzuto
(74) *Attorney, Agent, or Firm*—Sughrue Mion, PLLC

(57) ABSTRACT

Composition comprising at least one ethylenically unsaturated monomer to which a photochemically isomerizable or dimerizable molecule is covalently bonded, and at least one ethylenically unsaturated monomer to which a sensitizer is covalently bonded, are outstandingly suitable for producing polymeric alignment layers for liquid crystals.

12 Claims, No Drawings

POLYMERIZABLE COPOLYMERS FOR ALIGNMENT LAYERS

The present invention relates to a composition comprising (a) at least one ethylenically unsaturated monomer to which a photochemically isomerizable or dimerizable molecule is covalently bonded, (b) one polymer having covalently bonded sensitizers in side chains, and c) optionally other ethylenically unsaturated monomers; to an electrooptical device comprising, on a (flat) substrate material, an optionally photocrosslinked layer of said composition; to an electrooptical device comprising, on a (flat) substrate material, a photocrosslinked layer of said composition and, on said photocrosslinked layer, a liquid-crystalline layer; and to the use of the copolymers as an alignment layer for liquid crystals.

In recent times, alignment layers for liquid crystals have played a considerable role in the production of electrooptical elements, for example liquid-crystal displays. These alignment layers can also, in combination with liquid-crystal polymers, be used for the production of optical compensation films, for example, for optical delay filters, cholesteric filters, antireflection filters and for safety elements, among other uses. Such alignment layers are polymers which are applied to a substrate and, on irradiation with (polarized) light of suitable wavelength and energy density, are crosslinked over the whole surface or selectively.

This technology is known and is described, for example, for different photoactive polymers in EP-A-0 763 552, U.S. Pat. No. 5,539,074, WO 96/10049, WO 01/53384 and EP-A-0 860 455. For the photoinduced crosslinking of the photoactive polymers, a relatively high energy density is required. To increase the photosensitivity, it is possible to add to the polymers molecular sensitizers which absorb in the wavelength range of the irradiation light and transfer energy to the photoactive, isomerizable or dimerizable groups, the latter groups only being excited to a slight extent, if at all, in the selected wavelength range. In this way, the required energy density can be reduced, which is not yet, however, regarded as being sufficiently practicable.

It has now been found that, surprisingly, the photosensitivity is considerably increased, the energy density required is considerably reduced and the information of the direction of the polarized irradiation light is retained in the course of energy transfer when copolymers composed of monomers having covalently bonded isomerizable or dimerizable groups and composed of monomers having covalently bonded sensitizers are used to produce alignment layers.

First, the invention provides a composition comprising
a) at least one ethylenically unsaturated monomer to which a photochemically isomerizable or dimerizable molecule is covalently bonded,
b) at least one ethylenically unsaturated monomer to which a sensitizer is covalently bonded, and
c) optionally other ethylenically unsaturated comonomers.

The monomers a) are preferably selected from the group of acrylates, methacrylates, acrylamides and methacrylamides, to which a photochemically isomerizable or dimerizable molecule is covalently bonded directly or via a bridging group in the ester or amide group.

The inventive copolymers are random copolymers.

Photochemically isomerizable and dimerizable molecules are, for example, those molecules which undergo a cis/trans isomerization or a [2+2]-cycloaddition under the influence of radiation and lead to crosslinking of the polymer.

The photoisomerizable group may be, for example, an azobenzene group.

The photodimerizable group may be, for example, an ethylenically unsaturated group which is preferably bonded to a carbocyclic or heterocyclic aromatic ring. Particular preference is given to an alkoxycarbonyl group being bonded to the ethylenically unsaturated group, for example $C_1$-$C_{12}$-alkoxy-, preferably $C_1$-$C_8$-alkoxy-, and more preferably $C_1$-$C_4$-alkoxycarbonyl. Examples of alkoxy are methoxy, ethoxy, and the isomers of propoxy, butoxy, pentyloxy, hexyloxy, heptyloxy, octyloxy, nonyloxy, decyloxy, undecyloxy and dodecyloxy. Especially preferably, alkoxy is ethoxy and particularly methoxy. In a further preferred embodiment, the ethylenically unsaturated group is bonded to the polymer backbone via a C(O) group and bridging group bonded thereto, and an optionally substituted aryl or heteroaryl group is bonded to the second carbon atom of the ethylenically unsaturated group. The photodimerizable groups may be, for example, derivatives of cinnamate, chalcone or coumarin.

The photopolymerizable group may correspond, for example, to the formulae A and B

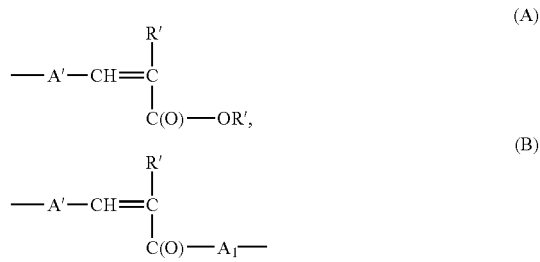

where
R' is hydrogen or $C_1$-$C_4$-alkyl,
A' is an optionally substituted mono- or divalent aromatic radical or an optionally substituted mono- or divalent heteroaromatic radical, and
$A_1$ is a bridging group.

In a preferred embodiment, R' is methyl and in particular hydrogen.

A' may be, for example, phenylene, pyrimidine-2,5-diyl, pyridine-2,5-diyl, 2,5-thiophenylene, 2,5-furanylene, 1,4- or 2,6-naphthylene. A' may also be two or three such aromatic radicals joined together, either directly or via a bridging group. Suitable bridging groups are, for example, O, S, NH, N($C_1$-$C_4$-alkyl), C(O), C(O)O, OC(O)O, S(O), $SO_2$, S(O)O, OS(O)O, $SO_2$O, $OSO_2$O, Si($C_1$-$C_4$-alkyl)$_2$, OP(O$C_1$-$C_4$-alkyl)O, P(O$C_1$-$C_4$-alkyl)O, P(O)(O$C_1$-$C_4$-alkyl)O, $C_2$-$C_6$-alkylidene and $C_1$-$C_6$-alkylene.

Suitable substituents for A' are, for example, $C_1$-$C_6$-alkyl, $C_1$-$C_6$-hydroxyalkyl, $C_1$-$C_6$-halogenalkyl, $C_6$-$C_{10}$-aryl, $C_7$-$C_{12}$-aralkyl, $C_1$-$C_6$-alkoxy, $C_1$-$C_6$-hydroxyalkoxy, $C_1$-$C_6$-halogen-alkoxy, $C_6$-$C_{10}$-aryloxy, $C_7$-$C_{12}$-aralkyloxy, $C_1$-$C_6$-acyl, $C_1$-$C_6$-alkoxycarbonyl, $C_1$-$C_6$-hydroxyalkoxycarbonyl, $C_1$-$C_6$-alkoxycarbonyloxy, $C_1$-$C_6$-hydroxyalkoxycarbonyloxy, $C_1$-$C_6$-alkylaminocarbonyl, $C_1$-$C_6$-dialkylaminocarbonyl, $C_1$-$C_6$-alkylaminocarbonyloxy, $C_1$-$C_6$-dialkylamino-carbonyloxy, halogen (F, Cl and Br), OH, COOH, $CONH_2$, CN and nitro.

A', as an aromatic radical, is more preferably optionally substituted phenylene, naphthylene, biphenylene, or biphenylene joined via bridging groups, said bridging groups preferably being selected from the group of O, S, CO, C(O), C(O)O, OC(O)O, NH, N-methyl, $SO_2$, methylene, ethylene, ethylidene and isopropylidene.

The bridging group $A_1$ may be, for example, $C_1$-$C_{20}$-alkylene and preferably $C_1$-$C_{14}$-alkylene, which is unsubstituted or substituted by fluorine, chlorine, cyano or $C_1$-$C_6$-alkoxy, and which is optionally interrupted by one or more identical or different heteroatoms or —O—, —S—, —C(O)O—, —O(O)C—, —OC(O)O—, —NH—, —NC$_1$-C$_4$-alkyl-, —NHC(O)—, —C(O)NH—, —NHC(O)NH—, —NC$_1$-C$_4$-alkyl-C(O)—, —C(O)—NC$_1$-C$_4$-alkyl-, —NC$_1$-C$_4$-alkyl-C(O)—NC$_1$-C$_4$-alkyl-, —O(CO)NH—, —OC(O)—NC$_1$-C$_4$-alkyl-, —NHC(O)O—, —NC$_1$-C$_4$-alkyl-C(O)O— and —CH=CH— groups.

The monomer of component (a) of the inventive copolymers is preferably selected from acrylate and, more preferably, methacrylate.

Monomers (a) are widely known and described, for example, in the literature cited at the outset or can be prepared by similar processes.

The monomers (a) may correspond to the formula I or the formula Ia

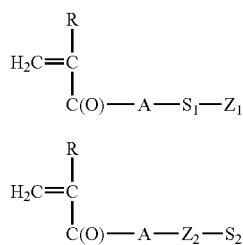

where

R is H or $C_1$-$C_8$-alkyl,

A is a bridging group, $S_1$ is an optionally substituted divalent, and $S_2$ an optionally substituted monovalent, aromatic or heteroaromatic radical, and $Z_1$ is a monovalent, and $Z_2$ a divalent, radical of a molecule which isomerizes or dimerizes photochemically.

For $S_1$, $S_2$, $Z_1$ and $Z_2$, the preferences and the embodiments given for the groups of the formulae (A) and (B) apply.

When R is alkyl, it is preferably $C_1$-$C_4$-alkyl, for example butyl, propyl, ethyl and more preferably methyl.

The bridging group A may be $C_1$-$C_{20}$-alkylene and preferably $C_1$-$C_{18}$-alkylene, which is unsubstituted or substituted by fluorine, chlorine, cyano or $C_1$-$C_6$-alkoxy, and is optionally interrupted by one or more identical or different heteroatoms or —O—, —S—, —C(O)O—, —O(O)C—, OC(O)O—, —NH—, —NC$_1$-C$_4$-alkyl-, —NHC(O)—, —C(O)NH—, —NHC(O)NH—, —NC$_1$-C$_4$-alkyl-C(O)—, —C(O)—NC$_1$-C$_4$-alkyl-, —NC$_1$-C$_4$-alkyl-C(O)—NC$_1$-C$_4$-alkyl-, —O(CO)NH—, —OC(O)—NC$_1$-C$_4$-alkyl-, —NHC(O)O—, —NC$_1$-C$_4$-alkyl-C(O)O— and —CH=CH— groups.

The monomers (a) preferably correspond to the formula Ib or to the formula Ic,

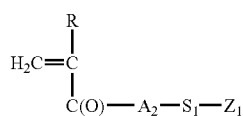

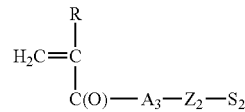

where

R is hydrogen or methyl, $A_2$ is a bivalent radical of the formula —O—$C_nH_{2n}$—$X_1$—, $A_3$ is a bivalent radical of the formula —O—$C_nH_{2n}$—O—, n is a number from 2 to 18 and preferably from 4 to 16, $X_1$ is a direct bond or a —O—, —S—, —C(O)O—, —O(O)C—, —OC(O)O—, —NH—, —NC$_1$-C$_4$-alkyl-, —NHC(O), —C(O)NH—, —NHC(O)NH—, —NC$_1$-C$_4$-alkyl-C(O)—, —C(O)—NC$_1$-C$_4$-alkyl-, —NC$_1$-C$_4$-alkyl-C(O)—NC$_1$-C$_4$-alkyl-, —O(CO)NH—, —OC(O)—NC$_1$-C$_4$-alkyl-, —NHC(O)O— or —NC$_1$-C$_4$-alkyl-C(O)O— group, $S_1$, where present, is phenylene, biphenylene or —$C_6H_4$—$X_2$—$C_6H_4$—, $S_2$, where present, is substituted phenyl, biphenyl or —$C_6H_4$—$X_2$—$C_6H_5$, $X_2$ is —O—, —S—, —C(O)O—, —O(O)C—, —OC(O)O—, —NH—, —NC$_1$-C$_4$-alkyl-, —NHC(O)—, —C(O)NH—, —NHC(O)NH—, —NC$_1$-C$_4$-alkyl-C(O)—, —C(O)—NC$_1$-C$_4$-alkyl-, —NC$_1$-C$_4$-alkyl-C(O)—NC$_1$-C$_4$-alkyl-, —O(CO)NH—, —OC(O)—NC$_1$-C$_4$-alkyl-, —NHC(O)O— or —NC$_1$-C$_4$-alkyl-C(O)O—, $Z_1$ is a radical of the formula —CH=CH—C(O)—OR$_1$, $Z_2$ is a radical of the formula —CH=CH—C(O)—, and $R_1$ is $C_1$-$C_{18}$-alkyl, more preferably $C_1$-$C_{12}$-alkyl, and especially preferably $C_1$-$C_4$-alkyl.

Preferred substituents for $S_1$ and $S_2$ are $C_1$-$C_4$-alkyl and $C_1$-$C_4$-alkoxy, in particular methoxy and ethoxy.

Examples of the $C_nH_{2n}$ group are methylene, ethylene, 1,2- or 1,3-propylene, 1,2-, 1,3- or 1,4-butylene, and also α,ω-alkylenes or isomers of pentylene, hexylene, heptylene, octylene, nonylene, decylene, undecylene, dodecylene, tridecylene, tetradecylene, pentadecylene, hexadecylene, heptadecylene, octadecylene, nonadecylene and eicosylene.

In a particularly preferred embodiment, the monomers (a) correspond to the formula Id or to the formula Ie

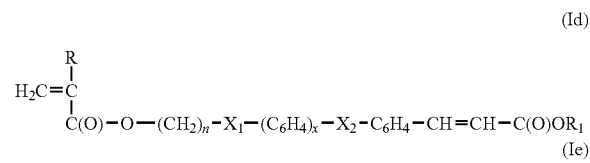

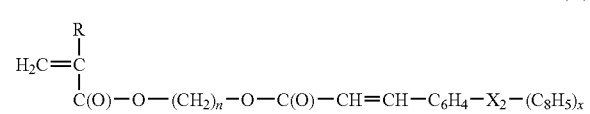

where

R is methyl, n is a number from 2 to 20, preferably from 4 to 14, $R_1$ is $C_1$-$C_4$-alkyl and preferably methyl, x is 0 or 1, $X_2$ is a direct bond, —O—, —S—, —CO—, —OC(O)— or —C(O)O—, and the $C_6H_4$ and $C_6H_5$ groups are each independently unsubstituted or substituted by 1 to 3 $C_1$-$C_4$-alkyl and/or $C_1$-$C_4$-alkoxy, preferably methoxy.

Monomers a) are known and are described, for example, in the literature mentioned at the outset or can be prepared by similar processes.

The monomers b) are preferably selected from the group of acrylates, methacrylates, acrylamides, methacrylamides, maleic monoesters, and allyl or methallyl or crotonyl alcohol, to which a sensitizer is covalently bonded directly or via a bridging group in the ester or amide group or to the alcohol group.

Sensitizers and functional sensitizers are known in a great variety or can be prepared by known processes. Preference is given to colourless sensitizers and triplet sensitizers.

Suitable functional groups are, for example, halogen, OH, SH, $NH_2$, NH—$C_1$-$C_4$-alkyl, NCO, COOH, $SO_3H$, $PO_3H$ and appropriate ester and amide groups which enter into an addition or substitution reaction with nucleophiles.

Examples of sensitizers are aromatic nitro compounds such as coumarins (7-diethylamino-4-methylcoumarin, 7-hydroxy-4-methylcoumarin), ketocoumarins, carbonylbiscoumarins, aromatic 2-hydroxyketones and amino-substituted, aromatic 2-hydroxyketones (2-hydroxybenzophenone, mono- or di-p-(dimethylamino)-2-hydroxybenzophenone), acetophenones, anthraquinones, xanthones, thioxanthones, benzanthrones, naphthothiazolines (2-benzoylmethyl-1-methylnaphthothiazoline), benzothiazoles, nitroanilines (m- or p-nitroaniline, 2,4,6-trinitroaniline) or nitroacenaphthenes (5-nitroacenaphthene), (2-[(m-hydroxy-p-methoxy)styryl]benzothiazole, benzoin alkyl ethers, N-alkylated phthalones, acetophenone ketals (2,2-dimethoxyphenylethanone), naphthalenes, anthracenes (2-naphthalenemethanol, 2-naphthalenecarboxylic acid, 9-anthracenemethanol and 9-anthracenecarboxylic acid), benzopyranes, azoindolizines and merocyanines. Preference is given to aromatic 2-hydroxyketones (benzophenones), coumarins, ketocoumarins, carbonylbiscoumarins, acetophenones, anthraquinones, xanthones, thioxanthones and acetophenone ketals.

The sensitizers are bonded to the ethylenically unsaturated group directly or preferably via a bridging group.

The monomers b) may correspond, for example, to the formula II

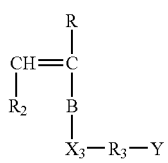 (II)

where
R is H or $C_1$-$C_4$-alkyl,
$R_2$ is H or —$COOR_7$,
$R_3$ is a direct bond or a bivalent bridging group,
B is methylene or —C(O)—,
Y is the monovalent radical of a sensitizer,
$X_3$ is —O—, —NH— or —N($C_1$-$C_4$-alkyl)-,
$X_3$ is —O— when B is methylene, and
$R_7$ is H, $C_1$-$C_{20}$-alkyl, $C_3$-$C_{12}$-cycloalkyl or phenyl-$C_1$-$C_6$-alkyl.

R is preferably H and more preferably methyl. $R_2$ is preferably H. $R_7$ is preferably H, $C_1$-$C_{12}$-alkyl and more preferably $C_1$-$C_4$-alkyl, for example methyl, ethyl, propyl and butyl. B is preferably —C(O)—.

$R_3$ is preferably a bivalent bridging group. The bridging group $R_3$ may contain, in the chain, from 1 to 30 atoms, preferably from 2 to 20 atoms and more preferably from 2 to 12 atoms, selected from the group of C, O, S and N, which are bonded to the sensitizer molecule via ether, thioether, amine, ester, amide or urethane groups. The bridging group is preferably a hydrocarbon radical which may be interrupted by one or more heteroatoms from the group of O, S and N, and which are bonded to the sensitizer molecule via ether, thioether, amine, ester, amide or urethane groups.

The bridging group $R_3$ may correspond, for example, to the formula (III)

 (III)

where
$X_4$ is a direct bond, or $X_4$ is a radical selected from the —O—, —S—, —$NR_6$—, —C(O)—O—, —O—C(O)—, —O—C(O)—O—, —$SO_2$—O—, —O—$SO_2$—, —O—$SO_2$—O, —$NR_6$—C(O)—, —C(O)—$NR_6$—, —$NR_6$-C(O)—O—, —O—C(O)—$NR_6$—, —$NR_6$—C(O)—$NR_6$—, —$NR_6$—$SO_2$—, —$SO_2$—$NR_6$—, —$NR_6$—$SO_2$—O—, —O—$SO_2$—$NR_6$— or —$NR_6$—$SO_2$—$NR_6$ groups,
$R_4$ is a bivalent group having from 1 to 30 atoms selected from the group of C, O, S and N in the chain,
$R_5$ is a direct bond, $C_1$-$C_{12}$-alkylene, phenylene or phenyl $C_1$-$C_{12}$-alkylene, and
r and s are each the numbers 0 or 1, with the prerequisite that r is 1 when $X_4$ is one of said groups,
$R_6$ is H or $C_1$-$C_{12}$-alkyl, $C_5$- or $C_6$-cycloalkyl, $C_5$- or $C_6$-cycloalkylmethyl or -ethyl, phenyl, benzyl or 1-phenyleth-2-yl.

$R_5$ is preferably a direct bond, $C_1$-$C_6$-alkylene or phenylene.

$R_6$ in the definition of alkyl contains preferably from 1 to 6 and more preferably from 1 to 4 carbon atoms. Some examples are methyl, ethyl, n- or isopropyl, butyl, hexyl and octyl. $R_6$ in the definition of cycloalkyl is preferably cyclohexyl, and, in the definition of cycloalkylmethyl, cyclohexylmethyl. In a preferred embodiment, $R_6$ is H or $C_1$-$C_4$-alkyl.

The bivalent $R_4$ group is preferably a hydrocarbon radical which preferably has from 1 to 30, more preferably from 2 to 18, particularly preferably from 2 to 12 and especially preferably from 2 to 8, carbon atoms, which is unsubstituted or mono- or polysubstituted by $C_1$-$C_4$-alkyl, $C_1$-$C_4$-alkoxy or =O. The hydrocarbon radical may also be interrupted once or more than once with heteroatoms selected from the group of —O—, —S— and —$NR_6$— where $R_6$ is preferably H or $C_1$-$C_4$-alkyl.

The bivalent $R_4$ group may be, for example, $C_1$-$C_{20}$-alkylene, preferably $C_2$-$C_{12}$-alkylene, which may be linear or branched. Some examples are methylene, ethylene, 1,2- or 1,3-propylene, 1,2-, 1,3- or 1,4-butylene, pentylene, hexylene, octylene, dodecylene, tetradecylene, hexadecylene and octadecylene.

The bivalent $R_4$ group may be, for example, polyoxaalkylene having from 2 to 12, preferably 2-6 and more preferably 2 to 4, oxaalkylene units, and from 2 to 4, preferably 2 or 3, carbon atoms in the alkylene. It is more preferably polyoxaethylene and polyoxapropylene having from 2 to 6 oxaalkylene units.

The bivalent $R_4$ group may be, for example, $C_5$-$C_{12}$-cycloalkylene, preferably $C_5$-$C_8$-cycloalkylene and more preferably $C_5$- or $C_6$-cycloalkylene, for example cyclopentylene, cyclohexylene, cyclooctylene or cyclododecylene.

The bivalent $R_4$ group may be, for example, $C_5$-$C_{12}$-, preferably $C_5$-$C_8$- and more preferably $C_5$- or $C_5$-cycloalkyl-$C_1$-

$C_{12}$ and preferably —$C_1$-$C_4$-alkyl. Some examples are -cyclopentyl-$C_nH_{2n}$— and -cyclohexyl-$C_nH_{2n}$—, where n is a number from 1 to 4. Particular preference is given to -cyclohexyl-$CH_2$—.

The bivalent $R_4$ bridging group may be, for example, $C_5$-$C_{12}$-, preferably $C_5$-$C_8$- and more preferably $C_5$- or $C_6$-cycloalkyl-($C_1$-$C_{12}$-alkyl)$_2$- and preferably (—$C_1$-$C_4$-alkyl)$_2$. Some examples are cyclopentyl-($C_nH_{2n}$—)$_2$ and cyclohexyl-($C_nH_{2n}$—)$_2$, where n is a number from 1 to 4. Particular preference is given to —$CH_2$-cyclohexyl-$CH_2$—.

The bivalent $R_4$ bridging group may be, for example, $C_6$-$C_{14}$-arylene and preferably $C_6$-$C_{10}$-arylene, for example naphthylene or more preferably phenylene.

The bivalent $R_4$ bridging group may be, for example, $C_7$-$C_{20}$-aralkylene and preferably $C_7$-$C_{12}$-aralkylene. Greater preference is given to arylene-$C_nH_{2n}$—, where arylene is naphthylene and particularly phenylene and n is a number from 1 to 4. Examples are benzylene and phenylethylene.

The bivalent $R_4$ bridging group may be, for example, arylene-($C_nH_{2n}$—)$_2$— where arylene is preferably naphthylene and particularly phenylene, and n is a number from 1 to 4. Examples are xylylene and phenyl($CH_2CH_2$)$_2$—.

In a preferred embodiment, the monomers b) correspond to the formula IIa

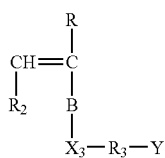

(IIa)

where
R is H or methyl,
$R_2$ is H,
B is —C(O)—,
Y is the monovalent radical of a sensitizer,
$X_3$ is —O—, and
$R_3$ is a radical of the formula —($R_4$)$_r$—$X_4$—($R_5$)$_s$— where
$R_4$ is $C_1$-$C_{20}$-alkylene, polyoxaethylene or polyoxapropylene having from 2 to 10 oxaalkylene units, $C_5$- or $C_6$-cycloalkylene, -cyclopentyl-$C_nH_{2n}$— and -cyclohexyl-$C_nH_{2n}$— where n is 1 or 2, cyclopentyl-($C_nH_{2n}$—)$_2$ and cyclohexyl-($C_nH_{2n}$—)$_2$ where n is 1 or 2, phenylene, benzylene, phenylethylene or xylylene,
$R_5$ is a direct bond or $C_1$-$C_4$-alkylene,
$X_4$ is a radical selected from the group of —O—, —S—, —$NR_6$—, —C(O)—O—, —O—C(O)—, —O—C(O)—O—, —$SO_2$—O—, —O—$SO_2$, —O—$SO_2$—O, —$NR_6$—C(O)—, —C(O)—$NR_6$—, —$NR_6$—C(O)—O—, —O—C(O)—$NR_6$—, —$NR_6$—C(O)—$NR_6$—, —$NR_6$—$SO_2$, —$SO_2NR_6$—, —$NR_6$—$SO_2$—O—, —O—$SO_2$—$NR_6$— or —$NR_6$—$SO_2$—$NR_6$, and
r is the number 1 and s is 0 or the number 1.

In formula IIa, $R_4$ is preferably $C_2$-$C_{12}$-alkylene, and polyoxaethylene or polyoxapropylene having from 2 to 6 oxaalkylene units.

Preferred monovalent radicals of sensitizers Y are coumarins, ketocoumarins, carbonylbiscoumarins and benzophenones.

It has been found that particularly effective substances are polymerizable monomers having monovalent ketocoumarin radicals and carbonylbiscoumarin radicals. These are novel and also form part of the subject-matter of the invention, for example those of the formula IIb

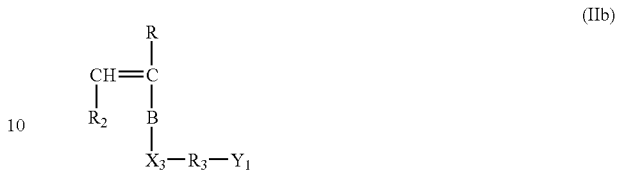

(IIb)

where R, $R_2$, $R_3$, B and $X_3$ are each as defined for formula IIa, including the preferred embodiments, and $Y_1$ is the monovalent radical of a ketocoumarin or carbonylbiscoumarin.

In a preferred embodiment, $R_3$ is a radical of the formula —($R_4$)$_r$—$X_4$—($R_5$)$_s$—, where
$R_4$ is $C_2$-$C_{18}$-alkylene or polyoxaethylene or polyoxapropylene having from 2 to 10 oxaalkylene units,
$R_5$ is a direct bond or $C_1$-$C_2$-alkylene, and
$X_4$ is a radical selected from the group of —O—, —$NR_6$—, —C(O)—O—, —O—C(O)—, —O—C(O)—O—, —$NR_6$—C(O)—, —C(O)—$NR_6$—, —$NR_6$—C(O)—O—, —O—C(O)—$NR_6$—, —$NR_6$—C(O)—$NR_6$—,
r is the number 1 and s is 0 or the number 1, and
$R_6$ is H, methyl or ethyl.

The monovalent ketocoumarin radical $Y_1$ preferably corresponds to the formula

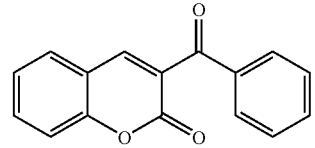

and the monovalent carbonylbiscoumarin radical preferably corresponds to the formula

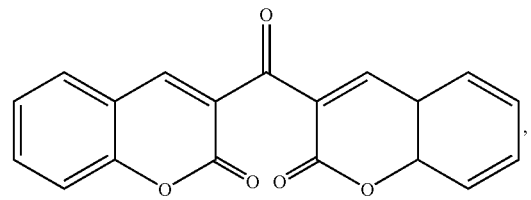

, where the benzene radicals may contain substituents, for example, $C_1$-$C_4$-alkyl, $C_1$-$C_4$-alkoxy or mono- or di-$C_1$-$C_4$-alkylamino, or substituents on adjacent carbon atoms of the benzene rings may form a fused aromatic or heteroaromatic ring.

Some of the monomers b) are known or they can be prepared by processes known per se for introducing functionalized side chains. 7-Acryloxycoumarin is described, for example, by G. A. Delzenne et al. in Ind. Chim. Beige (1967), 32, pages 373-378. Other polymerizable sensitizers such as pyrenes, anthracenes and benzophenones are described by J. K. Oh et al. in J. of Pol. Science, Part A: Polymer Chemistry, Vol. 10, pages 3001 to 3011 (2002). Functionalized carbonylbiscoumarins are described by D. P. Specht et al. in Tetrahedron, Vol. 38, No. 9, 1203-1211 (1982) or by D. Creed et al. in Journal of Polymer Science: Part A Polymer Chemistry, Vol. 39, 134-144 (2001).

The inventive composition may additionally comprise copolymerizable, ethylenically unsaturated monomers (c). They may be unsubstituted or substituted olefins, for example ethene, propene, butene, pentene, styrene, vinyl chloride, vinylidene chloride, acrylonitrile, (meth)acrylonitrile, (meth)acrylamide, N-alkylated or N-hydroxyalkylated (meth)acrylamides, alkyl(meth)acrylates and hydroxyalkyl(meth)acrylates having 1 to 20 carbon atoms in the ester group, vinyl and allyl esters and vinyl and allyl ethers having 1 to 20 carbon atoms in the ester or ether groups. Also suitable are alkyl (meth)acrylates, vinyl and allyl ethers of polyoxaalkylene diols, for example polyoxaethylene diols or polyoxa-1,2-propylene diols having from 2 to 200 oxaethylene units and/or 1,2-oxapropylene units. Such comonomers may be used to obtain desired physical and mechanical properties.

The inventive copolymers may also comprise residues of monomers having at least two ethylenically unsaturated groups. Such crosslinking agents may be used to attain desired physical and mechanical properties. Crosslinking agents are known in a wide range. Some examples are butadiene, isoprene, divinylbenzene and acrylic or methacrylic esters of polyols, for example ethylene glycol, propylene glycol, butylene glycol, hexanediol, diethylene glycol, 1,2,3-propanetriol, trimethylolpropane, pentaerythritol and dihydroxy- or dihydroxymethylcyclohexane.

The amount of the comonomers may, based on the weight of the composition, be, for example, from 20 to 99% by weight, preferably from 50 to 95% by weight and more preferably from 70 to 95% by weight, of comonomer (a), and from 80 to 1% by weight, preferably from 50 to 1% by weight and more preferably from 30 to 1% by weight, of comonomer (b). When a comonomer (c) is present, it may replace from 50 to 1% by weight, preferably from 40 to 5% by weight and more preferably from 30 to 5% by weight, of comonomer (a). The percentages by weight add up to 100% by weight. Up to 5% by weight of crosslinkers may be present, based on the composition.

The inventive composition may additionally comprise inert solvents.

Suitable solvents are, for example, aliphatic, cycloaliphatic and aromatic hydrocarbons (pentane, hexane, petroleum ether, cyclohexane, methylcyclohexane, benzene, toluene, xylene), aliphatic halo hydrocarbons (methylene chloride, chloroform, di- and tetrachloroethane), nitriles (acetonitrile, propionitrile, benzonitrile), ethers (diethyl ether, dibutyl ether, t-butyl methyl ether, ethylene glycol dimethyl ether, ethylene glycol diethyl ether, diethylene glycol dimethyl ether, tetrahydrofuran, dioxane, diethylene glycol monomethyl ether or diethylene glycol monoethyl ether), ketones (acetone, methyl isobutyl ketone, cyclopentanone, cyclohexanone), carboxylic esters and lactones (ethyl acetate or methyl acetate, valerolactone), N-substituted lactams (N-methylpyrrolidone), carboxamides (dimethylacetamide, dimethylformamide), acyclic ureas (dimethylimidazoline), and sulphoxides and sulphones (dimethyl sulphoxide, dimethyl sulphone, tetramethylene sulphoxide, tetramethylene sulphone) and alcohols (methanol, ethanol, propanol, butanol, ethylene glycol monomethyl ether, ethylene glycol monoethyl ether, diethylene glycol monomethyl ether). Solvents may be used alone or in a mixture of at least two solvents.

The concentration of the copolymers or comonomers in the solutions depends substantially upon the desired layer thickness which is to be achieved on a substrate, and also upon the viscosity of the solutions. The amount of the comonomers may be, for example, from 0.1 to 20% by weight, preferably from 0.1 to 15% by weight and more preferably from 0.5 to 10% by weight.

The inventive compositions may additionally comprise polymerization initiators. Among the polymerization initiators, preference is given to free-radical initiators which generate free radicals thermally and/or by irradiation. Especially suitable for ethylenically unsaturated monomers are azo compounds, for example 2,2'-azobisisobutyronitrile, 2,2'-azobis (2-methylbutyronitrile), 2,2'-azobis(2,4-dimethylvaleronitrile) or macroinitiators such as macroazo initiators which contain, for example, polyethylene glycol units. Polymerization initiators are generally used in amounts of from 0.1 to 10% by weight, based on the entirety of the monomers.

The polymerizable compositions are coating compositions and are outstandingly suitable for producing alignment layers by polymerization of a thin layer of said composition on a substrate.

The invention further provides the use of the inventive composition for producing alignment layers on a substrate material.

The invention further provides a composite material composed of a substrate and a thin layer of a polymerizable composition or of a copolymer of this composition, comprising a) at least one ethylenically unsaturated monomer to which a photochemically isomerizable or dimerizable molecule is covalently bonded, b) at least one ethylenically unsaturated monomer to which a sensitizer is covalently bonded, and c) optionally other ethylenically unsaturated comonomers.

For components a), b) and c), the embodiments and preferences specified above apply.

The layer thickness of the composition or of the copolymer on the support may be, for example, from 0.01 to 500 µm, preferably from 0.05 to 200 µm, more preferably from 0.05 to 100 µm and especially preferably from 0.05 to 50 µm. In the case of optical applications, the thicknesses of orientation layers are frequently in the range from 10 to 100 nm.

Substrate materials are known and their form may differ depending on the application. Flat and even substrates are preferred. Examples of substrate materials are alumina, titania, silicon dioxide (glass or quartz) or mixed oxides, for example indium tin oxide (ITO), and also polymers and organic glasses, for example polyethylene, polypropylene, polyesters such as polyethylene terephthalate, polycarbonates, polyurethanes, polyamides, poly(meth)acrylates and triacetylcellulose. In the case of inventive applications for optical devices, it is in particular polymers, glass or optionally a substrate (for example glass plates coated with ITO) coated with an electrically conductive material (which serves as an electrode) that are at the forefront as substrate materials.

The coated substrates may be produced by coating processes known per se, for example painting, dipping, rolling, knife-coating and casting. To produce thin layers, it has been found that spin-coating is particularly useful for producing thin layers, since uniform layer thicknesses can be obtained. After the coating, the coated material is dried, for example by evaporating the solvent by means of heating, applying a vacuum or both measures.

Compositions are polymerized after the coating by the action of actinic radiation. The thus obtained material having a layer of the inventive copolymer is stable and can be brought onto the market as such for further processing.

The inventive coated material is particularly suitable for aligning liquid crystals in a layer which is applied to the copolymer. To this end, the copolymer layer is initially irradiated with linear-polarized light and the photoactive group is isomerized or dimerized. Suitable radiation sources are particularly UV sources, for example high-pressure mercury lamps, xenon lamps or UV laser using a polarizer. When structures are to be formed, irradiation is appropriately effected through a mask. The illumination times are considerably reduced compared to mixtures of comonomers a) and sensitizers, for example down to half or less, depending on the content of comonomer b). Liquid-crystalline compounds are then applied to the thus prepared layers, said compounds being molecular compounds, polymers or polymerizable monomers or oligomers.

Such liquid-crystalline compounds are known and are described in U.S. Pat. No. 55,993,617, U.S. Pat. No. 5,567,349, U.S. Pat. No. 5,650,534 and WO 99/64924 (see structures C and D.). Commercial liquid-crystal formulations such as OPALVA™ 2130 are obtainable from Vantico AG (Basle). Structures C and D:

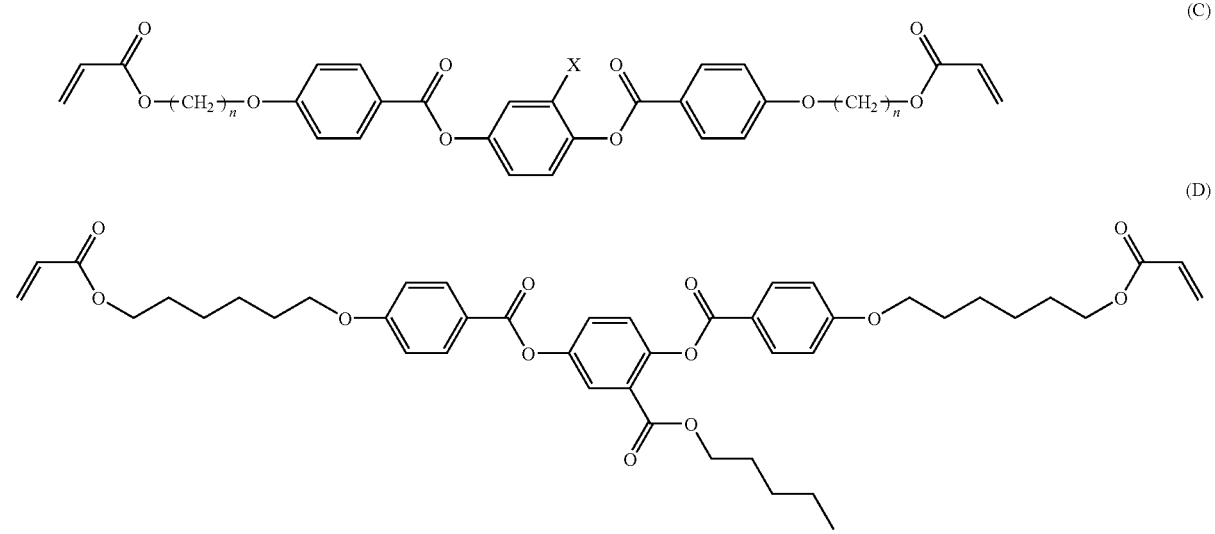

where X is hydrogen; fluorine, chlorine, bromine; or lower alkyl such as methyl, ethyl, propyl or butyl, and n is an integer from 3 to 12.

Preference is given to using polymerizable liquid-crystalline monomers whose alignment on the alignment layers is fixed (frozen-in) by the polymerization. To produce the liquid-crystal layers, the same techniques may be applied as for the coating with an alignment layer. The thicknesses of the liquid-crystal layer are, for example, in the range from 10 nm to 10 µm, preferably from 100 nm to 5 µm, especially preferably from 500 nm to 3 µm.

The invention further provides a composition comprising, on a (flat) substrate material, a photocrosslinked layer of the inventive composition and, on said photocrosslinked layer, a liquid-crystalline layer, preferably a polymeric liquid-crystalline layer.

The composite material produced in accordance with the invention features, owing to a high photosensitivity of the copolymers, excellent and uniform contrast performance even with short illumination times.

The examples which follow illustrate the invention in detail. The 4'-dimethylamino-2-hydroxy-5-methylbenzophenone used in Example A1 is prepared in a similar manner to the publication of J. K. Oh et al. in J. of Pol. Science, Part A: Polymer Chemistry, Vol. 10, pages 3001 to 3011 (2002).

A) Preparation of Monomers

EXAMPLE A1

Preparation of 4-dimethylamino-2-(8-methacroyloxy-n-oct-1-yloxy)-5-methyl-benzophenone of the Formula

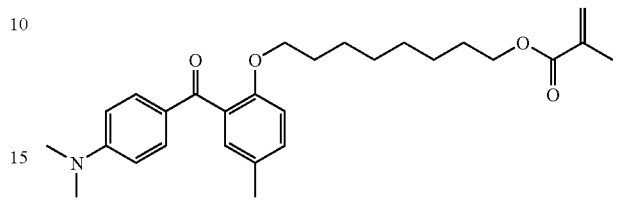

a) Preparation of 4-dimethylamino-2-(8-hydroxy-n-octyloxy)-5-methyl-benzophenone In a 50 ml three-necked round-bottomed flask, 1.51 g (5.9 mmol) of 4'-dimethylamino-2-hydroxy-5-methylbenzophenone are dissolved in 10.5 ml of dimethylformamide. 3.24 g (23.17 mmol) of potassium carbonate are then added at room temperature. A temperature rise to approx. 30° C. is observed and the yellow solution immediately becomes orange. The suspension is heated to 100° C. Then, 1.46 g (8.614 mmol) of 8-chloro-1-octanol are added dropwise within 10 minutes. The dark-orange suspension is stirred at 100° C. for 2 hours and then cooled to room temperature. To dissolve the salts, 25 ml of water are added and the brown solution is then extracted using dichloromethane. The organic phase is washed with sodium hydrogencarbonate (w=0.095 g/g) and then concentrated on a rotary evaporator. The resulting brown oil is fractionally filtered through 200 g of silica gel (Merck 0.04-063 mesh) with 1 l of hexane/ethyl acetate (1:1), followed by 1 l of ethyl acetate. The ethyl acetate fraction is then concentrated by evaporation on a rotary evaporator. 1.97 g of a yellow oil are obtained, which crystallizes after 2 days (81.4% of theory); m.p.: 56.9° C.

b) Preparation of the Title Compound

A 50 ml three-necked round-bottomed flask is initially charged with 1.93 g (4.71 mmol) of 4-dimethylamino-2-(8-hydroxy-n-octyl)oxy-5-methylbenzophenone and 0.929 g (9.18 mmol) of triethylamine, and also 1.4 mg of di-tert-butyl-p-cresol as a stabilizer. Then, 10 ml of anhydrous dichloromethane are added and the yellowish clear solution is cooled to 0° C. Within 20 minutes, a solution of 0.66 g of methacrylol chloride in 10 ml of anhydrous dichloromethane is now added dropwise. The now cloudy reaction mixture is stirred at 0° C. for one hour, then warmed to room temperature and stirred for a further hour. Then, 30 ml of sodium hydrogencarbonate (w=0.095 g/g) are added and the mixture is stirred vigorously for 10 minutes. The biphasic mixture is transferred to a separating vessel and the phases are separated. The organic phase is washed with 50 ml of water and the combined water phases are then washed with 50 ml of methylene chloride. The combined organic extracts are concentrated on a rotary evaporator. 2.27 g of dark-yellow oil are obtained, which are chromatographed through 200 g of silica gel (Merck 0.04-0.63 mesh) with 3 l of hexane/ethyl acetate (6:4). Similar fractions are combined and concentrated on a rotary evaporator. 1.97 g of a yellow, viscous oil are obtained (87.8% of theory); UV (THF, $\lambda_{max}$): 334 nm.

EXAMPLE A2

Preparation of
3-benzoyl-7-(2-methacroyloxy-n-ethyloxy)coumarin
of the Formula

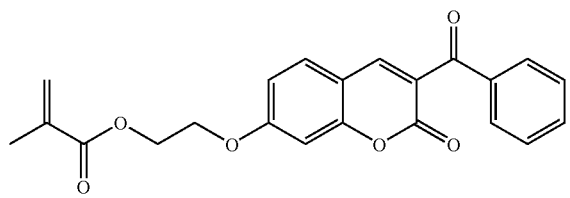

a) Preparation of 3-benzoyl-7-hydroxycoumarin

A 350 ml sulphonation flask having magnetic stirrer, condenser and thermometer is initially charged with 14.09 g (0.1 mol) of 2,4-dihydroxybenzaldehyde which are taken up in 162 ml of ethanol. 18.66 g (0.105 mol) of ethylbenzoyl acetate are now added to the slightly orange suspension. The orange suspension is then heated to 35° C. and an orange solution is immediately obtained. 9.12 g (0.105 mol) of piperidine are then added and the mixture is stirred efficiently. The reaction mixture is warmed to 38° C. It is then heated to reflux and stirred at an internal temperature of 77° C. for 2 hours. After cooling to room temperature and concentration on a rotary evaporator at 45° C./180-5 mbar, 35.38 g of red, viscous foam are obtained. The latter is fractionally filtered through 485 g of silica gel (Merck 0.04-0.63 mesh) using 4 liters of toluene and ethanol (9:1). The product fractions are combined and concentrated on a rotary evaporator. 22 g of orange solid are obtained which are taken up in 88 g of toluene and heated to reflux. 178 g of ethanol are added to the orange suspension until a clear brown solution is obtained. After cooling to room temperature, yellow crystals precipitate out. The suspension is stirred overnight and the resulting yellow crystals are filtered off, washed with a little cold toluene, followed by n-hexane, and dried at room temperature/20 mbar. 10.9 g of light yellow crystals are obtained. The mother liquor is concentrated and 9.6 g of a brown and soft solid are obtained. The latter is recrystallized at 0° C. from 60 g of ethanol and a further 2.59 g of product are obtained. The crystals are combined and a total yield of 13.49 g is obtained (48% of theory). Melting point 240° C.; HPLC: 100% purity, UV (THF $\lambda_{max}$): 342 nm.

b) Preparation of the Title Compound

A 100 ml sulphonation flask equipped with dropping funnel, thermometer and argon sparge is initially charged with 1.63 g (0.0125 mol) of 2-hydroxyethyl methacrylate, 2.66 g (0.01 mol) of 3-benzoyl-7-hydroxycoumarin and 3.31 g (0.0125 mol) of triphenylphosphine, which are taken up in 40 g of anhydrous tetrahydrofuran. The yellow suspension is cooled to 0° C. Then, a solution of 2.66 g (0.0125 mol) of diisopropyl azodicarboxylate (Fluka 11626) in 8.31 g of tetrahydrofuran is added dropwise at 0° C. within 30 min. The reaction which is slightly exothermic at the start leads to a dark-yellow, clear solution. On completion of addition, the reaction mixture is allowed to warm to room temperature and stirred for a further 2 hours. The majority of the tetrahydrofuran is distilled off on a rotary evaporator at 40° C./280 mbar and the yellow viscous residue is partitioned between 50 ml of dichloromethane and 30 ml of 0.1 molar hydrochloric acid, and agitated, and the phases are separated. The aqueous phase is washed with 30 ml of dichloromethane. The organic extracts are combined and washed with 30 ml of saturated sodium hydrogencarbonate solution, followed by 30 ml of water. The organic phase is concentrated on a rotary evaporator at 40° C./700-10 mbar and 10.28 g of yellow oil are obtained. The latter is applied to 480 g of silica gel (Merck 0.04-0.63 mesh) and fractionally filtered using 5 l of hexane and ethyl acetate (1:1). 400 ml fractions are taken. Similar fractions are combined and concentrated on a rotary evaporator. 6.3 g of yellow solid are obtained. The latter is taken up in 30 g of diisopropyl ether and the resulting light yellow suspension is brought into solution by adding 22 ml of acetonitrile under reflux. The solution is stored at room temperature overnight, in the course of which yellow needles precipitate out. These are filtered off and are washed with diisopropyl ether, and dried at room temperature/15 mbar. 2.99 g of light yellow solid are obtained (79% of theory). Melting point: 140° C.; HPLC: 99% purity, UV (THF; $\lambda_{max}$): 346 nm.

EXAMPLE A3

Preparation of 3-benzoyl-7-[5-methacroyloxydi(ethylenoxy)]coumarin of the Formula

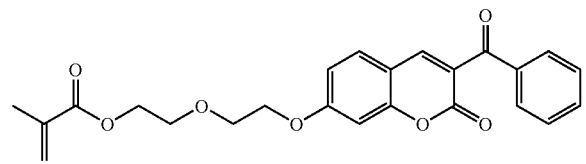

A 100 ml sulphonation flask equipped with dropping funnel, thermometer and argon sparge is initially charged with 1.68 g (0.0125 mol) of diethylene glycol monomethacrylate, 2.63 g (0.01 mol) of 3-benzoyl-7-hydroxycoumarin and 3.31 g (0.0125 mol) of triphenylphosphine, which are taken up in 40 g of anhydrous tetrahydrofuran. The yellow suspension is cooled to 0° C. Then, a solution of 2.66 g (0.0125 mol) of diisopropyl azodicarboxylate in 8.31 g of tetrahydrofuran is added dropwise at 0° C. within 30 min. The reaction which is slightly exothermic at the start leads to a dark-yellow, clear solution. On completion of addition, the reaction mixture is allowed to warm to room temperature and stirred for a further 2 hours. The tetrahydrofuran is distilled off on a rotary evaporator at 40° C./280 mbar and the yellow viscous residue is partitioned between 50 ml of dichloromethane and 60 ml of 0.5 molar hydrochloric acid, and agitated, and the phases are separated. The aqueous phase is washed with 30 ml of dichloromethane. The organic extracts are combined and washed with 30 ml of saturated sodium hydrogencarbonate solution, and also with 30 ml of water. The organic phase is concentrated on a rotary evaporator at 40° C./700-10 mbar and 11.2 g of yellow solid are obtained. The latter is dissolved in 6 g of acetone and the resulting yellow solution is admixed dropwise with 100 ml of diisopropyl ether. Greenish crystals precipitate out. The resulting suspension is stored at −15° C. overnight and then filtered. The crystal slurry is washed with 10 ml of cold diisopropyl ether and 50 ml of n-hexane and dried at room temperature (RT)/15 mbar. 1.96 g of greenish crystals are obtained (46% of theory). Melting point: 77.5° C.; HPLC: 95% purity, UV (THF; $\lambda_{max}$): 346 nm.

EXAMPLE A4

Preparation of 3-benzoyl-7-(8-methacroyloxy-n-oct-1-yloxy)coumarin of the Formula

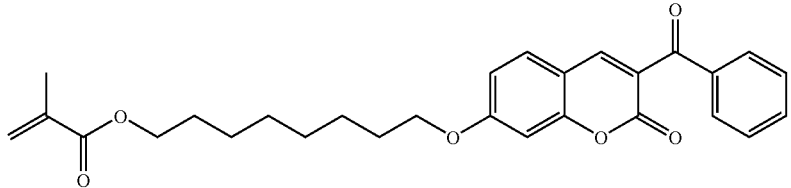

a) Preparation of 3-benzoyl-7-(8-hydroxy-n-oct-1-yloxy)coumarin

The compound is prepared in a similar manner to Example A1a by reacting 3-benzoyl-7-oxycoumarin with 8-chloro-1-octanol.

b) Preparation of the Title Compound

In a 100 ml sulphonation flask equipped with magnetic stirrer, dropping funnel, thermometer and argon sparge, 4.78 g (0.012 mol) of 3-benzoyl-7-(8-hydroxy-n-oct-1-yloxy)coumarin and 3.50 g (0.035 mol) of triethylamine are dissolved in 51 g of anhydrous dichloromethane. 4.3 mg (0.02 mmol) of di-tert-butyl-p cresol are added as an inhibitor. The light yellow clear solution is cooled to 0° C. and a solution of 2.07 g (0.019 mol) of methacryloyl chloride in 11.5 g of dichloromethane is then added dropwise within 30 min. The reaction mixture is stirred at 0° C. for 1 hour and at room temperature for 2 hours. The reaction mixture is then poured onto 60 ml of 10% sodium hydrogencarbonate solution and stirred vigorously for 10 min. The phases are then separated and the organic phase is washed with 100 ml of water. The combined water phases are washed with 60 ml of dichloromethane. The organic phases are combined and concentrated on a rotary evaporator at 40° C./700-10 mbar. 6.5 g of yellow oil are obtained as a crude product. The latter is applied to 450 g of silica gel and fractionally filtered using 3 l of hexane/ethyl acetate (6:4). Fractions of 200 ml are taken. Similar fractions are combined and concentrated on a rotary evaporator. 3.1 g of yellow viscous oil are obtained. The latter is taken up in 20 g of n-hexane. The biphasic mixture is admixed with 6 g of ethyl acetate and heated briefly to reflux, and the clear yellow solution is cooled to 0° C. Yellowish crystals precipitate out. The latter are filtered off after cooling in an ice bath for 2 hours. The resulting crystals are washed with a cold mixture of n-hexane/ethyl acetate (9:1) and dried at RT/15 mbar. 1.85 g of light yellow crystals are obtained. From the mother liquor, it is possible to isolate product of the same quality twice more by the same procedure. In this way, a total of 2.4 g of light yellow crystals are obtained (43% of theory). HPLC: 93% purity.

EXAMPLE A5

Preparation of 3-acetyl-7-(2-methacroyloxy-n-ethyloxy)coumarin of the Formula

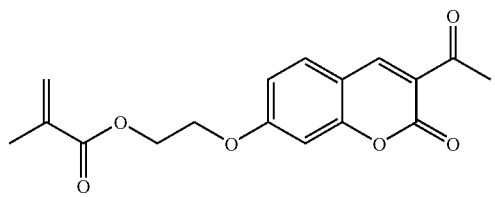

a) Preparation of 3-acetyl-7-hydroxycoumarin

A 250 ml round-bottomed flask with magnetic stirrer, condenser and argon sparge is initially charged with 11.28 g (0.08 mol) of 2,4-dihydroxybenzaldehyde which are taken up in 129.6 g of ethanol. 9.85 g (0.84 mol) of methyl acetoacetate are then added to the slightly orange suspension. This forms a slightly yellow solution. 7.3 g (0.084 mol) of piperidine are then added and the mixture is stirred efficiently. The reaction mixture is warmed to 38° C. and immediately becomes dark brown. The mixture is then heated to reflux and stirred at an internal temperature of 77° C. for 2 hours. After cooling to room temperature and concentration on a rotary evaporator at 45° C./180-5 mbar, 24 g of brown powder are obtained. The latter is fractionally filtered through 200 g of silica gel using 8 l of dichloromethane/ethyl acetate (9:1). Finally, elution is effected with 1 l of methanol. Product fractions are combined and concentrated on a rotary evaporator. 13.9 g of light-brown solid are obtained which are taken up in 417 ml of acetone/water (2:1) and heated to reflux. The brown solution is concentrated to half its volume on a rotary evaporator, in the course of which yellow crystals precipitate out. To complete the crystallization, the suspension is stored at 0° C. overnight and then filtered. The crystal slurry is washed with 50 ml of cold water, followed by 100 ml of cold acetone/water (2:1), and dried at 50° C./15 mbar. 8.96 g of yellow crystals are obtained (48% of theory).

Melting point: 239° C.; HPLC: 100% purity, UV (THF, $\lambda_{max}$): 259 nm.

b) Preparation of the Title Compound

A 100 ml sulphonation flask equipped with dropping funnel, thermometer and argon sparge is initially charged with 1.63 g (0.0125 mol) of 2-hydroxyethyl methacrylate, 2.15 g (0.01 mol) of 3-acetyl-7-hydroxycoumarin and 3.31 g (0.0125 mol) of triphenylphosphine, which are taken up in 40 g of anhydrous tetrahydrofuran. The yellow suspension is cooled to 0° C. Then, a solution of 2.66 g (0.0125 mol) of diisopropyl azodicarboxylate in 8.31 g of tetrahydrofuran is added dropwise at 0° C. within 30 min. The reaction which is slightly exothermic at the start leads to a dark-yellow, clear solution. On completion of addition, the reaction mixture is allowed to warm to room temperature and stirred for a further 2 hours. The tetrahydrofuran is distilled off on a rotary evaporator at 40° C./280 mbar and the yellow viscous residue is partitioned between 50 ml of dichloromethane and 30 ml of 0.1 molar hydrochloric acid, and agitated, and the phases are separated. The aqueous phase is washed with 30 ml of dichloromethane. The organic extracts are combined and washed with 30 ml of saturated sodium hydrogencarbonate solution, and then with 30 ml of water. The organic phase is concentrated on a rotary evaporator at 40° C./700-10 mbar and 10.46 g of yellow solid are obtained. The latter is applied to 480 g of silica gel and fractionally filtered using 5 l of dichloromethane/ethyl acetate (95:5). 400 ml fractions are taken. Similar fractions are combined and concentrated on a rotary evaporator. 2.99 g of a yellow solid are obtained (35% of theory). Melting point: 138.7° C.; HPLC: 99% purity, UV (THF, $\lambda_{max}$): 346 nm.

EXAMPLE A6

Preparation of
3-acetyl-7-(8-methacroyloxy-n-oct-1-yloxy)coumarin
of the Formula

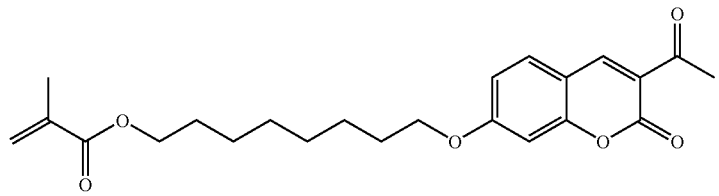

In a 50 ml round-bottomed flask equipped with magnetic stirrer, dropping funnel and argon sparge, 0.916 g (0.0027 mol) of 3-acetyl-7-(8-hydroxy-n-oct-1-yloxy)coumarin and 0.533 g (0.0053 mol) of triethylamine are dissolved in 6 g of anhydrous tetrahydrofuran. 0.8 mg (0.003 mmol) of BHT is added as an inhibitor. The light yellow clear solution is cooled to 0° C. and then a solution of 0.378 g (0.0035 mol) of methacryloyl chloride in 3.74 g of tetrahydrofuran is added dropwise within 10 min. The reaction mixture is stirred at 0° C. for 1 hour and then at room temperature for 2 hours. Since there has only been 50% conversion in the reaction, 2 portions each of 0.18 g (0.0016 mol) of methacryloyl chloride are added 1 hour apart. The reaction mixture is stirred at room temperature overnight and then poured onto 50 ml of aqueous sodium hydrogencarbonate solution (10%), 50 ml of ethyl acetate are added and the mixture is stirred vigorously for 10 min. The phases are then separated and the aqueous phase is washed with 50 ml of water. The combined organic phases are then washed with 30 ml of water. The organic phase is concentrated on a rotary evaporator at 40° C./300-10 mbar. 1.32 g of yellow oil are obtained as a crude product. The latter is applied to a 50 g silica gel column (prepacked FlashPack from Jones Chromatography) and eluted with 600 ml of dichloromethane/ethyl acetate (95:5). 15 ml fractions are taken. Similar fractions are combined and concentrated on a rotary evaporator. 0.71 g of light yellow crystals is obtained (69% of theory). Melting point: 84.1° C.; HPLC: 98% purity, UV (THF, $\lambda_{max}$): 361 nm.

EXAMPLE A7

Preparation of
3-acetyl-7-(methacroyloxydecaethylenoxy)coumarin
of the Formula

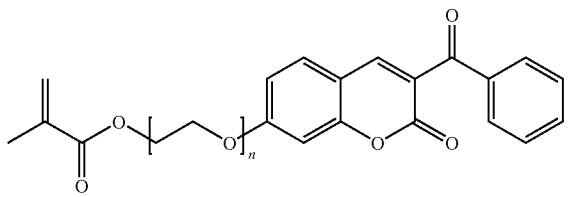

n = 10

1.15 g (0.0021 mol) of polyethylene glycol methacrylate, MW=526 g/mol, and 0.728 g (0.0027 mol) of 3-benzoyl-7-hydroxycoumarin, and also 0.71 g (0.0027 mol) of triphenylphosphine are suspended with stirring in 21 g of anhydrous tetrahydrofuran in a 100 ml round-bottomed flask. The reaction mixture is sparged with argon and stirred at room temperature. Within 12 minutes, a solution of 0.57 g (0.0027 mol) of diisopropyl azodicarboxylate in 4.34 g of tetrahydrofuran is now added dropwise. In the course of this, the yellow suspension becomes an orange solution. The latter is stirred at room temperature over 6 hours. The product is not isolated and the solution is used directly in Example B13.

B) Preparation of Copolymers

EXAMPLE B1

Copolymer of Monomer A and Monomer of Example A1b) in a Molar Ratio of 98:2

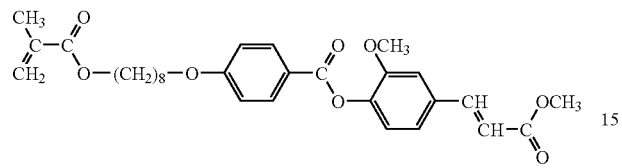

(A)

4.29 g (8 mmol) of monomer A, 0.099 g (0.163 mmol) of monomer of Example A1a and 0.0136 g (0.0817 mmol) of 2,2'-azobisisobutyronitrile (Fluka 11630) are dissolved with stirring in 21.7 g of tetrahydrofuran (THF) in a Schlenk tube. The reaction vessel is sealed in an airtight manner and, to degas the mixture, the stirred, clear, colourless solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 20 g of THF and filtered through a 0.2 μm membrane of polytetrafluoroethylene (PTFE). The filtrate is then added dropwise to 327 g of methanol in a beaker with vigorous stirring at from −10° C. to 0° C. The precipitated, voluminous and white polymer sediments rapidly on the bottom of the beaker after the stirrer has been switched off. After standing at room temperature for 30 minutes, the crude copolymer is obtained by filtration through a paper filter. The resulting white solid is immediately dissolved again in 22 g of THF and reprecipitated in 327 g of methanol at from −10° C., to 0° C. The purified, now monomer-free copolymer is filtered off. After drying at room temperature/18 mbar, 3.37 g of white powder having the following properties are obtained:

Tg 61.8° C.; gel-permeation chromatography (GPC, THF, 35° C., polystyrene standard):

Mn=64500 g/mol, Mw=157000 g/mol; polydispersity (D)=2.43; NMR: 2.2 mol % fraction of 4-dimethylamino-2-(8-methacryloxy-n-octyl)oxy-5-methylbenzophenone.

EXAMPLE B2

Copolymer of Monomer A and Monomer of Example A1b) in a Molar Ratio of 85:15

4.29 g (8 mmol) of monomer A, 1.215 g (2 mmol) of monomer of Example A1a and 0.0166 g (0.1 mmol) of 2,2'-azobisisobutyronitrile (Fluka 11630) are dissolved with stirring in 26.63 g of tetrahydrofuran (THF) in a Schlenk tube. The reaction vessel is sealed in an airtight manner and, to degas the mixture, the stirred, clear, colourless solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 20 g of THF and filtered through a 0.2 μm membrane of polytetrafluoroethylene (PTFE). The filtrate is then added dropwise to 327 g of methanol in a beaker with vigorous stirring at from −10° C. to 0° C. The precipitated, voluminous and almost white polymer sediments rapidly on the bottom of the beaker after the stirrer has been switched off. After standing at room temperature for 30 minutes, the crude copolymer is obtained by filtration through a paper filter. The resulting light yellow solid is immediately dissolved again in 22 g of THF and reprecipitated in 327 g of methanol at from −10° C. to 0° C. The purified, now monomer-free copolymer is filtered off. After drying at room temperature/18 mbar, 4.15 g of light yellow powder having the following properties are obtained:

Tg=54.3° C.; gel-permeation chromatography (GPC, THF, 35° C., polystyrene standard):

Mn=59800 g/mol, Mw=140000 g/mol; polydispersity (D)=2.34; NMR: 15 mol % fraction of 4-dimethylamino-2-(8-methacryloxy-n-oct-1-yloxy)-5-methylbenzophenone.

EXAMPLE B3

Copolymer of Monomer A and Monomer of Example A2b) in a Molar Ratio of 88:12

1.34 g (0.0025 mmol) of [[8-[(2-methyl-1-oxo-2-propenyl)oxy]octyl]oxy]-2-methoxy-4-(3-methoxy-3-oxo-1-propenyl)phenyl benzoate, 0.107 g (0.0003 mol) of monomer A2b and 0.0046 g (0.028 mmol) of 2,2'-azobisisobutyronitrile are dissolved with stirring in 8.66 g of anhydrous tetrahydrofuran (THF) in a Schlenk tube. The reaction vessel is sealed in an airtight manner and, to degas the mixture, the stirred solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 μm PTFE membrane. The filtrate is then added dropwise with vigorous stirring at from −10 to 0° C. to 111 g of methanol which has been initially charged in a beaker. The precipitated, almost white polymer is voluminous and powdery. After being left to stand at room temperature for 30 minutes, the crude product is isolated by filtration through a paper filter. The resulting almost white solid is dissolved again immediately in 10 g of THF and reprecipitated in 111 g of methanol at from −10° C. to 0° C. The purified, now monomer-free copolymer is obtained by filtration. After drying at room temperature/18 mbar, 0.9 g of almost white powder having the following properties is obtained:

Tg=66.7° C.; GPC: Mn: 56900 g/mol, Mw: 132000 g/mol, D: 2.31; NMR: 9.1% (w/w) or 12.2% (mol/mol) proportion of monomer A2b.

EXAMPLE B4

Copolymer of Monomer A and Monomer of Example A2b) in a Molar Ratio of 77:23

1.34 g (0.0025 mmol) of [[8-[(2-methyl-1-oxo-2-propenyl)oxy]octyl]oxy]-2-methoxy-4-(3-methoxy-3-oxo-1-propenyl)phenyl benzoate, 0.241 g (0.0006 mol) of monomer A2b and 0.0052 g (0.031 mmol) of 2,2'-azobisisobutyronitrile are dissolved with stirring in 9.75 g of anhydrous THF in a Schlenk tube. The reaction vessel is sealed in an airtight manner and, to degas the mixture, the stirred solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 μm PTFE membrane. The filtrate is then added dropwise with vigorous stirring at from −10 to 0° C. to 111 g of methanol which has been initially charged in a beaker. The precipitated, almost white polymer is voluminous and powdery. After being left to stand at room temperature for 30 minutes, the crude product is isolated by filtration. The resulting almost white solid is dissolved again immediately in 10 g of THF and reprecipitated in 111 g of methanol at from −10° C. to 0° C. The purified, now monomer-free copolymer is obtained by filtration. After drying at room temperature/18 mbar, 0.95 g of almost white powder having the following properties is obtained:

Tg=71.7° C.; GPC: Mn: 60244 g/mol, Mw: 119000 g/mol, D: 1.98; NMR: 17.9% (w/w) or 23.2% (mol/mol) proportion of monomer A2b.

EXAMPLE B5

Copolymer of Monomer A and Monomer of Example A3 in a Molar Ratio of 91:9

1.34 g (0.0025 mmol) of [[8-[(2-methyl-oxo-2-propenyl)oxy]octyl]oxy]-2-methoxy-4-(3-methoxy-3-oxo-1-propenyl)phenyl benzoate, 0.094 g (0.00022 mol) of monomer A3 and 0.0045 g (0.027 mmol) of 2,2'-azobisisobutyronitrile are dissolved with stirring in 9.04 g of anhydrous THF in a Schlenk tube. The reaction vessel is sealed in an airtight manner and, to degas the mixture, the colourless solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 μm PTFE membrane. The filtrate is then added dropwise with vigorous stirring at from −10 to 0° C. to 109 g of methanol which has been initially charged in a beaker. The precipitated, almost white polymer is voluminous and powdery. After being left to stand at room temperature for 30 minutes, the crude product is isolated by filtration. The resulting almost white solid is dissolved again immediately in 10 g of THF and reprecipitated in 111 g of methanol at from −10° C. to 0° C. The purified, now monomer-free copolymer is obtained by filtration. After drying at room temperature/8 mbar, 0.92 g of almost white powder having the following properties is obtained:

Tg=51.4° C.; GPC: Mn: 53100 g/mol, Mw: 111000 g/mol, D: 2.089; NMR: 7.1% (w/w) or 8.6% (mol/mol) proportion of monomer A3.

EXAMPLE B6

Copolymer of Monomer A and Monomer of Example A3 in a Molar Ratio of 74:26

1.34 g (0.0025 mmol) of [[8-[(2-methyl-1-oxo-2-propenyl)oxy]octyl]oxy]-2-methoxy-4-(3-methoxy-3-oxo-1-propenyl)phenyl benzoate, 0.359 g (0.00083 mol) of monomer A3 and 0.0055 g (0.033 mmol) of 2,2'-azobisisobutyronitrile are dissolved with stirring in 11.09 g of anhydrous THF in a Schlenk tube. The reaction vessel is sealed in an airtight manner and, to degas the mixture, the colourless solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 μm PTFE membrane. The filtrate is then added dropwise with vigorous stirring at from −10 to 0° C. to 109 g of methanol which has been initially charged in a beaker. The precipitated, almost white polymer is voluminous and powdery. After being left to stand at room temperature for 30 minutes, the crude product is isolated by filtration. The resulting light yellow solid is dissolved again immediately in 10 g of THF and reprecipitated in 111 g of methanol at from −10° C. to 0° C. The purified, now monomer-free copolymer is obtained by filtration. After drying at room temperature/8 mbar, 1.09 g of yellowish powder having the following properties is obtained:

Tg=56.4° C.; GPC: Mn: 49200 g/mol, Mw: 95300 g/mol, D: 1.938; NMR: 22.4% (w/w) or 26.3% (mol/mol) proportion of monomer A3.

EXAMPLE B7

Copolymer of Monomer A and Monomer of Example A4 in a Molar Ratio of 84:16

1.34 g (0.0025 mmol) of [[8-[(2-methyl-1-oxo-2-propenyl)oxy]octyl]oxy]-2-methoxy-4-(3-methoxy-3-oxo-1-propenyl)phenyl benzoate, 0.222 g (0.00044 mol) of monomer A4 and 0.0049 g (0.029 mmol) of 2,2'-azobisisobutyronitrile are dissolved with stirring in 5.88 g of anhydrous THF in a Schlenk tube. The reaction vessel is sealed in an airtight manner and, to degas the mixture, the colourless solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 μm PTFE membrane. The filtrate is then added dropwise with vigorous stirring at from −10 to 0° C. to 118 g of methanol which has been initially charged in a beaker. The precipitated, yellowish polymer is voluminous and powdery. After being left to stand at room temperature for 30 minutes, the crude product is isolated by filtration. The resulting light yellow solid is dissolved again immediately in 10 g of THF and reprecipitated in 118 g of methanol at from −10° C. to 0° C. The purified, now monomer-free copolymer is filtered off. After drying at room temperature/8 mbar, 0.98 g of yellowish powder having the following properties is obtained:

Tg=60.5° C.; GPC: Mn: 71000 g/mol, Mw: 186000 g/mol, D: 2.623; NMR: 14.3% (w/w) or 15.9% (mol/mol) proportion of monomer A4.

EXAMPLE B8

Copolymer of Monomer A and Monomer of Example A4 in a Molar Ratio of 74:26

1.071 g (0.002 mmol) of [[8-[(2-methyl-1-oxo-2-propenyl)oxy]octyl]oxy]-2-methoxy-4-(3-methoxy-3-oxo-1-propenyl)phenyl benzoate, 0.335 g (0.00067 mol) of monomer A4 and 0.0044 g (0.027 mmol) of 2,2'-azobisisobutyronitrile are dissolved with stirring in 5.33 g of anhydrous THF in a Schlenk tube. The reaction vessel is sealed in an airtight manner and, to degas the mixture, the solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 μm PTFE membrane. The filtrate is then added dropwise with vigorous stirring at from −10 to 0° C. to 107 g of methanol which has been initially charged in a beaker. The precipitated, light yellow polymer is voluminous and powdery. After being left to stand at room temperature for 30 minutes, the crude product is filtered off. The resulting light yellow solid is dissolved again immediately in 10 g of THF and reprecipitated in 107 g of methanol at from −10° C. to 0° C. The purified, now monomer-free copolymer is in turn filtered off. After drying at room temperature/8 mbar, 0.98 g of yellowish powder having the following properties is obtained:

Tg=60.7° C.; GPC: Mn: 57300 g/mol, Mw: 163000 g/mol, D: 2.844; NMR: 23.3% (w/w) or 25.7% (mol/mol) proportion of monomer A4.

EXAMPLE B9

Copolymer of Monomer A and Monomer of Example A5b) in a Molar Ratio of 90:10

1.338 g (0.0025 mmol) of [[8-[(2-methyl-1-oxo-2-propenyl)oxy]octyl]oxy]-2-methoxy-4-(3-methoxy-3-oxo-1-propenyl)phenyl benzoate, 0.079 g (0.00025 mol) of monomer A5b) and 0.0046 g (0.027 mmol) of 2,2'-azobisisobutyronitrile are dissolved with stirring in 7.33 g of anhydrous THF in a Schlenk tube. The reaction vessel is sealed in an airtight manner and, to degas the mixture, the solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 µm PTFE membrane. The filtrate is then added dropwise with vigorous stirring at from −10 to 0° C. to 110 g of methanol which has been initially charged in a beaker. The precipitated, yellowish polymer is voluminous and powdery. After being left to stand at room temperature for 30 minutes, the crude product is filtered off. The resulting yellowish solid is dissolved again immediately in 10 g of THF and reprecipitated in 125 g of methanol at from −10° C. to 0° C. The purified, now monomer-free copolymer is in turn filtered off. After drying at room temperature/8 mbar, 0.98 g of almost white powder having the following properties is obtained:

Tg=63° C.; GPC: Mn: 56900 g/mol, Mw: 135000 g/mol, D: 2.368; NMR: 6.2% (w/w) or 9.8% (mol/mol) proportion of monomer A5b).

EXAMPLE B10

Copolymer of Monomer A and Monomer of Example A5b) in a Molar Ratio of 77:23

1.338 g (0.0025 mmol) of [[8-[(2-methyl-1-oxo-2-propenyl)oxy]octyl]oxy]-2-methoxy-4-(3-methoxy-3-oxo-1-propenyl)phenyl benzoate, 0.198 g (0.00063 mol) of monomer A5b) and 0.0052 g (0.031 mmol) of 2,2'-azobisisobutyronitrile are dissolved with stirring in 7.64 g of anhydrous THF in a Schlenk tube. The reaction vessel is sealed in an airtight and, to degas the mixture, the solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 µm PTFE membrane. The filtrate is then added dropwise with vigorous stirring at from −10 to 0° C. to 125 g of methanol which has been initially charged in a beaker. The precipitated, yellowish polymer is voluminous and powdery. After being left to stand at room temperature for 30 minutes, the crude product is filtered off. The resulting light yellow solid is dissolved again immediately in 10 g of THF and reprecipitated in 125 g of methanol at from −10° C. to 0° C. The purified, now monomer-free copolymer is in turn filtered off. After drying at room temperature/8 mbar, 1.13 g of yellowish powder having the following properties is obtained:

Tg=72.2° C.; GPC: Mn: 64000 g/mol, Mw: 138000 g/mol, D: 2.15; NMR: 15.4% (w/w) or 23.2% (mol/mol) proportion of monomer A5b).

EXAMPLE B11

Copolymer of Monomer A and Monomer of Example A6 in a Molar Ratio of 91:9

1.338 g (0.0025 mmol) of [[8-[(2-methyl-1 oxo-2-propenyl)oxy]octyl]oxy]-2-methoxy-4-(3-methoxy-3-oxo-1-propenyl)phenyl benzoate, 0.102 g (0.00025 mol) of monomer A6 and 0.0046 g (0.027 mmol) of 2,2'-azobisisobutyronitrile are dissolved with stirring in 7.95 g of anhydrous THF in a Schlenk tube. The reaction vessel is sealed in an airtight manner and, to degas the mixture, the solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 µm PTFE membrane. The filtrate is then added dropwise with vigorous stirring at from −10 to 0° C. to 110 g of methanol which has been initially charged in a beaker. The precipitated, yellowish polymer is voluminous and powdery. After being left to stand at room temperature for 30 minutes, the crude product is filtered off. The resulting yellowish solid is dissolved again immediately in 10 g of THF and reprecipitated in 110 g of methanol at from −10° C. to 0° C. The purified, now monomer-free copolymer is in turn filtered off. After drying at room temperature/8 mbar, 1.13 g of almost white powder having the following properties is obtained:

Tg=59.4° C.; GPC: Mn: 48800 g/mol, Mw: 101000 g/mol, D: 2.061; NMR: 5.8% (w/w) or 8.6% (mol/mol) proportion of monomer A6.

EXAMPLE B12

Copolymer of Monomer A and Monomer of Example A6 in a Molar Ratio of 79:21

1.338 g (0.0025 mmol) of [[8-[(2-methyl-1-oxo-2-propenyl)oxy]octyl]oxy]-2-methoxy-4-(3-methoxy-3-oxo-1-propenyl)phenyl benzoate, 0.255 g (0.00063 mol) of monomer A6 and 0.0052 g (0.031 mmol) of 2,2'-azobisisobutyronitrile are dissolved with stirring in 8.33 g of anhydrous THF in a Schlenk tube. The reaction vessel is sealed in an airtight manner and, to degas the mixture, the solution is evacuated down to 200 mbar and aerated with nitrogen again. This procedure is repeated a total of five times. Subsequently, the reaction mixture is heated to 55° C. with stirring. After 15 hours, the reaction vessel is opened, and the now viscous solution is diluted with 5 g of THF and filtered through a 0.2 µm PTFE membrane. The filtrate is then added dropwise with vigorous stirring at from −10 to 0° C. to 125 g of methanol which has been initially charged in a beaker. The precipitated, yellowish polymer is voluminous and powdery. After being left to stand at room temperature for 30 minutes, the crude product is filtered off. The resulting light yellow solid is dissolved again immediately in 10 g of THF and reprecipitated in 125 g of methanol at from −10° C. to 0° C. The purified, now monomer-free copolymer is in turn filtered off. After drying at room temperature/8 mbar, 1.2 g of yellowish powder having the following properties is obtained:

Tg=62.3° C.; GPC: Mn: 51700 g/mol, Mw: 121000 g/mol, D: 2.351; NMR: 14.6% (w/w) or 20.7% (mol/mol) proportion of monomer A6.

EXAMPLE B13

Terpolymer of Monomer A, Polyethylene Glycol Methacrylate (Mw 526 g/mol) and Monomer of Example A7 in a Molar Ratio of 78:9:13

The solution described in Example A7 is used, 2.677 g (0.005 mol) of [[8-[(2-methyl-1-oxo-2-propenyl)oxy]octyl]oxy]-2-methoxy-4-(3-methoxy-3-oxo-1-propenyl)phenyl benzoate and 0.0118 g (0.072 mmol) of 2,2'-azobisisobutyronitrile are added, and the mixture is stirred to complete dissolution. The reaction vessel is sealed in an airtight manner, evacuated down to 200 mbar to degas and aerated again with nitrogen. This procedure is repeated a total of five times. Subsequently, the reaction mixture is heated to 55° C. with stirring. After 15 hours, the reaction vessel is opened, and the viscous solution is diluted with 20 g of THF and filtered through a 0.45 µm membrane of polytetrafluoroethylene (PTFE). The filtrate is then added dropwise with vigorous stirring at from −10 to 0° C. to 400 g of methanol which has been initially charged in a beaker. The precipitated white polymer is voluminous and sediments rapidly on the bottom of the beaker after the stirrer has been switched off, where it forms a tacky layer. After being left to stand at room temperature for 30 minutes, the crude product is obtained by decanting the methanol. The resulting yellow, rubber-like solid is immediately dissolved again in 20 g of THF and reprecipitated in 400 g of methanol at from −10° C. to 0° C. The purified, now monomer-free copolymer is decanted off. After drying at room temperature/10 mbar, 2.47 g of light yellow, amorphous, somewhat tacky powder having the following properties were obtained:

$^1$H-NMR: 8.7 mol % proportion of polyethylene glycol and 12.8 mol % of polyethylene glycol-O-(3-benzoyl-7-hydroxycoumarin); $T_g$=28.5° C.; gel-permeation chromatography (GPC, THF, 35° C., polystyrene standard): Mn=50300 g/mol, Mw=131000 g/mol; polydispersity (D)=2.596.

EXAMPLE B14

Terpolymer of Monomer A, Polyethylene Glycol Methacrylate (Mw 526 g/mol) and Monomer of Example A7 in a Molar Ratio of 77:1:22

2.68 g (0.005 mol) of [[8-[(2-methyl-1-oxo-2-propenyl)oxy]octyl]oxy]-2-methoxy-4-(3-methoxy-3-oxo-1-propenyl)phenyl benzoate, 1.15 g (0.0021 mol) of polyethylene glycol methacrylate, Mw=526 g/mol, and 0.0118 g (0.072 mmol) of 2,2'-azobisisobutyronitrile are dissolved with stirring in 25.34 g of anhydrous THF in a 100 ml round-bottomed flask. The reaction vessel is sealed in an airtight manner, evacuated down to 200 mbar to degas and aerated again with nitrogen. This procedure is repeated a total of five times. Subsequently, the reaction mixture is heated to 55° C. with stirring. After 15 hours, the reaction vessel is cooled to 30° C. and to the viscous solution are added 1.019 g (0.0038 mol) of 3-benzoyl-7-hydroxycoumarin, and 0.994 g (0.0038 mol) of triphenylphosphine. The resulting light yellow suspension is diluted with 13 g of THF. The suspension is kept at 30° C., blanketed under argon and stirred. A solution of 0.798 g (0.0038 mol) of diisopropyl azodicarboxylate in 3 g of THF is now added dropwise within 3 min. The reaction mixture becomes an orange solution. The latter is stirred at 30° C. over 42 hours. Afterwards, the orange solution is filtered off through a 0.45 µm membrane of polytetrafluoroethylene (PTFE). The filtrate is then added dropwise with vigorous stirring at from −10 to 0° C. to 400 g of methanol which has been initially charged in a beaker. The precipitated yellow polymer is voluminous and sediments rapidly on the bottom of the beaker after the stirrer has been switched off, where it forms a tacky layer. After being left to stand at room temperature for 30 minutes, the crude product is obtained by decanting. The resulting yellow, rubber-like solid is immediately dissolved again in 20 g of THF and reprecipitated in 400 g of methanol at from −10° C. to 0° C. The purified, now monomer-free copolymer is decanted off. After drying at room temperature/10 mbar, 2.58 g of light yellow, amorphous, somewhat tacky powder having the following properties were obtained:

$^1$H-NMR: 0.8 mol % proportion of polyethylene glycol-OH and 21.7 mol % of polyethylene glycol-O-(3-benzoyl-7-hydroxycoumarin); $T_g$=34.3° C.; gel-permeation chromatography (GPC, THF, 35° C., polystyrene standard): Mn=72400 g/mol, Mw=266000 g/mol; polydispersity (D)=3.674.

C) Production of Coated Substrates

EXAMPLE C1

A solution is prepared of 2% by weight of the copolymer of Example B1 in 7 ml of cyclopentanone. The solution is spin-coated in a spin-coating apparatus onto an ITO-coated glass plate at 60 seconds and 3000 rpm (acceleration=500 rps), so that a homogeneous layer of 50 nm forms. Afterwards, the layer is dried at 180° C. for 10 min and irradiated stripwise with different energy doses of 5/10/20/40/80/160/200,1400/800/1600/3200 mJ/cm$^2$ with linear-polarized light at a wavelength of 365 nm (Band Pass Filter BPF 365 nm). In this way, the amount of energy is determined at which alignment of the applied liquid-crystalline layer is observed for the first time. The results are reported in Table 1 of Example D1.

EXAMPLES C2-C14

The procedure of Example C1 is repeated, but copolymers of Examples B2 to B14 are used.

COMPARATIVE EXAMPLES

The procedure of Example C1 is repeated, but a homopolymer of monomer A is used which contains 33% by weight of Michler's ketone, 7% by weight or 22% by weight of 3-benzoyl-7-(5-methacroyloxy-n-(2-hydroxyethoxy)ethyloxy) coumarin as a sensitizer (Comparisons 1, 2 and 3).

D) Production of Substrates with Liquid Crystal and Copolymer Layer

EXAMPLE D1

A 15% by weight solution of a commercial photocrosslinkable liquid crystal formulation in cyclopentanone is used (OPALVA™ 2130, Vantico AG) and spin-coated using a spin-coating apparatus onto the copolymer layer of the coated glass plate of Example C1 (120 seconds at 1000 rpm, acceleration 500 rps), so that a homogeneous layer having a thickness of 700-800 nm is formed. The applied layer is aligned by heating to 50° C. (1 minute) and 40° C. (1 minute). Afterwards, the aligned layer is crosslinked by irradiating with 800 mJ/cm$^2$ of UV light in the 280-400 nm region under nitrogen.

EXAMPLES D2-D14

The procedure of Example D1 is repeated and coated glass plates of Examples C2 to C14 are used.

COMPARATIVE EXAMPLES

The procedure of Example D1 is repeated and coated glass plates of Comparative Examples 1 to 3 are used.

TABLE 1

| Example | Amount of energy (mJ/cm$^2$) |
|---|---|
| D1 | 400 |
| D2 | 80 |
| D3 | 80 |
| D4 | 40 |
| D5 | 160 |
| D6 | 40 |
| D7 | 40 |
| D8 | 40 |
| D9 | 80 |
| D10 | 40 |
| D11 | 80 |
| D12 | 40 |
| D13 | 80 |
| D14 | 40 |
| Comparison 1 | 800 |
| Comparison 2 | 300 |
| Comparison 3 | 80 |

E) Production of Substrates Having a Copolymer Layer

EXAMPLE E1

A solution is prepared of 2% by weight of the copolymer of Example B1 in 7 ml of cyclopentanone. The solution is spin-coated in a spin-coating apparatus onto an ITO-coated glass plate at 60 seconds and 3000 rpm (acceleration=500 rps), so that a homogeneous layer of 50 nm forms. Afterwards, the layer is dried at 180° C. for 10 min and irradiated stripwise with different energy doses of 5/10/20/30/80/40/50 mJ/cm$^2$ with linear-polarized light at a wavelength of from 280 to 400 nm (Short Cut Filter SCF 280 nm—mercury lamp).

Tilt angles are determined using a microscope which is additionally equipped with a Berek compensator which enables measurements of birefringences. A number of tilt domains B$_{tilt\ domain}$ in the illuminated strips is determined visually using the microscope. Tilt domains refer to regions of the coating having different tilt angles. In cross-polarized light, the boundaries between these zones can be recognized by sharply delimited differences in contrast. The presence of tilt domains shows that the alignment is not yet complete and is thus a measure of the photospeed of the alignment layer. The results are reported in Table 2 of Example F1.

EXAMPLES E2-E14

The procedure of Example E1 is repeated, but copolymers of Examples B2 to B14 are used.

COMPARATIVE EXAMPLE

The procedure of Example E1 is repeated, but a homopolymer of monomer A is used which contains 33% by weight of Michler's ketone, 7% by weight or 22% by weight of 3-benzoyl-7-(5-methacroyloxy-n-(2-hydroxyethoxy)ethyloxy) coumarin as a sensitizer (Comparisons 1, 2 and 3).

F) Production of Substrates Having a Copolymer Layer and Liquid-Crystalline Layer

EXAMPLE F1

A 15% by weight solution of a commercial photocrosslinkable liquid crystal formulation in cyclopentanone is used (OPALVA™ 2130, Vantico AG) and spin-coated using a spin-coating apparatus onto the copolymer layer of the coated glass plate of Example E1 (120 seconds at 1000 rpm, acceleration 500 rps), so that a homogeneous layer having a thickness of 700-800 nm is formed. The applied layer is aligned by heating to 50° C. (1 minute) and 40° C. (1 minute). Afterwards, the aligned layer is crosslinked by irradiating with 800 mJ/cm$^2$ of UV light in the 280-400 nm region under nitrogen.

EXAMPLES F2-F14

The procedure of Example F1 is repeated and coated glass plates of Examples E2 to E14 are used.

Comparison:
The procedure of Example F1 is repeated and coated glass plates of Comparative Examples 1-3 are used.

TABLE 1

| Example | B$_{tiltdomain}$ [1), 2)] | Tilt angle [2)] |
|---|---|---|
| F1 | ++++/+++/-/-/-/- | Not stable |
| F2 | +++/++/++/-/-/- | Approx. 35° (good stability); stable between 20 and 50 mJ/cm$^2$ |
| F3 | ++++/++++/-/-/-/- | Approx. 35° (good stability); stable between 20 and 50 mJ/cm$^2$ |
| F4 | +++/++/-/-/-/- | 0° |
| F5 | +++/+/+/-/-/- | Approx. 26° (very good stability); stable between 10 and 50 mJ/cm$^2$ |
| F6 | ++/+/-/-/-/- | 0° |
| F7 | +++/-/-/-/-/- | Not stable |
| F8 | +++/++/+/-/-/- | 0° |
| F9 | ++++/+++/+++/-/-/- | Approx. 35° (good stability); stable between 10 and 50 mJ/cm$^2$ |
| F10 | ++++/+/-/-/-/- | 0° |
| F11 | ++++/+++/+++/+/-/- | Not stable |
| F12 | ++++/+++/-/-/-/- | Not stable |
| F13 | ++/+/-/-/-/- | 0° |
| F14 | +++/+/-/-/-/- | 0° |
| Comparison 1 | ++++/++++/+++/+++/+++/++ | Not stable |
| Comparison 2 | ++++/+++/+++/++/-/- | Approx. 26° (very good stability); stable between 10 and 50 mJ/cm$^2$ |
| Comparison 3 | +++/++/-/-/-/- | Approx. 30° (very good stability); stable between 20 and 50 mJ/cm$^2$ |

[1)] +++ is very many; ++ is many; + is few; − is none
[2)] Illumination energies of 5/10/20/30/40/50 mJ/cm$^2$ in the 280 to 400 nm range (correspond to illumination energies of 2/4/8/12/16/20 mJ/cm$^2$ in the 280 to 340 nm range)

The invention claimed is:
1. Composition comprising
a) at least one ethylenically unsaturated monomer to which a photochemically isomerizable or dimerizable molecule, which corresponds to the formula A or B,

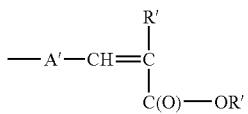

(A)

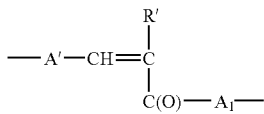

(B)

where

R' is hydrogen or $C_1$-$C_4$-alkyl,

A' is an optionally substituted mono- or divalent aromatic radical or an optionally substituted mono- or divalent heteroaromatic radical, and $A_1$ is a bridging group, is covalently bonded, b) at least one ethylenically unsaturated monomer to which a sensitizer is covalently bonded, which corresponds to the formula IIa

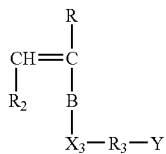

(IIa)

wherein

R is H or methyl, $R_2$ is H,

B is —C(O)—,

Y is ketocoumarin, carbonylbiscoumarin or benzophenone, $X_3$ is —O—, and $R_3$ is a radical of the formula —$(R_4)_r$—$X_4$—$(R_5)_s$ where $R_4$ is $C_1$-$C_{20}$-alkylene, polyoxaethylene or polyoxapropylene having from 2 to 10 oxaalkylene units, $C_5$- or $C_6$-cycloalkylene, -cyclopentyl-$C_nH_{2n}$— and -cyclohexyl-$C_nH_{2n}$— where n is 1 or 2, -cyclopentyl-$(C_nH_{2n})_2$- and -cyclohexyl-$(C_nH_{2n})_2$- where n is 1 or 2, phenylene, benzylene, phenylethylene or xylylene, $R_5$ is a direct bond or $C_1$-$C_4$-alkylene, $X_4$ is a radical selected from the group of —O—, —S—, —$NR_6$—, —C(O)—O—, —O—C(O)—, —O—C(O)—O—, —$SO_2$—O—, —O—$SO_2$—O—, —$NR_6$—C(O)—, —C(O)—$NR_6$—, —$NR_6$—C(O)—O—, —O—C(O)—$NR_6$—, —$NR_6$—C(O)—$NR_6$—, —$NR_6$—$SO_2$—, —$SO_2$—$NR_6$—, —$NR_6$—$SO_2$—O—, —O—$SO_2$—$NR_6$— or —$NR_6$—$SO_2$—$NR_6$—, and r is the number 1 and s is 0 or the number 1, and c) optionally other ethylenically unsaturated comonomers.

2. Composition according to claim 1, characterized in that the monomers a) correspond to the formula I or to the formula Ia

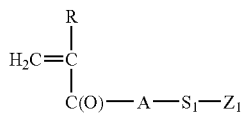

(I)

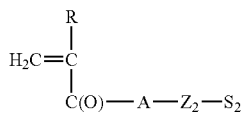

(Ia)

where

R is H or $C_1$-$C_8$-alkyl,

A is a bridging group, $S_1$ is an optionally substituted divalent and $S_2$ an optionally substituted monovalent aromatic or heteroaromatic radical, and $Z_1$ is a monovalent and $Z_2$ a divalent radical of a molecule which isomerizes or dimerizes photochemically.

3. Composition according to claim 1, characterized in that the monomers a) correspond to the formula Id or to the formula Ie

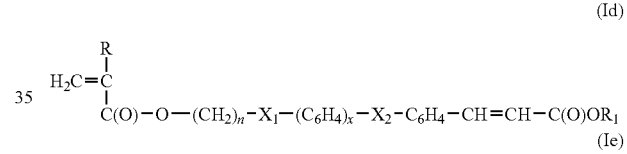

(Id)

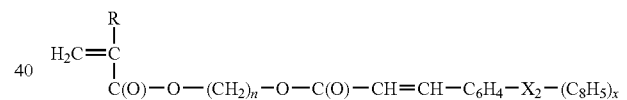

(Ie)

where

R is methyl, n is a number from 2 to 20, $R_1$ is $C_1$-$C_4$-alkyl, x is 0 or 1, $X_1$ is a direct bond or a —O—, —S—, —C(O)O—, —O(O)C—, —OC(O)O—, —NH—, —$NC_1$-$C_4$-alkyl-, —NHC(O)—, —C(O)NH—, —NHC(O)NH—, —$NC_1$-$C_4$-alkyl-C(O)—, —C(O)—$NC_1$-$C_4$-alkyl-, —$NC_1$-$C_4$-alkyl-C(O)—$NC_1$-$C_4$-alkyl-, —O(CO)NH—, —OC(O)—$NC_1$-$C_4$-alkyl-, —NHC(O)O— or —$NC_1$-$C_4$-alkyl-C(O)O— group, $X_2$ is a direct bond, —O—, —S—, —CO—, —OC(O)— or —C(O)O—, and the $C_6H_4$ and $C_6H_5$ groups are each independently unsubstituted or substituted by 1 to 3 $C_1$-$C_4$-alkyl and/or $C_1$-$C_4$-alkoxy.

4. Composition according to claim 1, characterized in that monomers c) are selected from the group of ethene, propene, butene, pentene, styrene, vinyl chloride, vinylidene chloride, acrylonitrile, (meth)acrylonitrile, (meth)acrylamide, N-alkylated or N-hydroxyalkylated (meth)acrylamides, alkyl (meth) acrylates and hydroxyalkyl (meth)acrylates having 1 to 20 carbon atoms in the ester group, vinyl and allyl esters and vinyl and allyl ethers having 1 to 20 carbon atoms in the ester or ether groups, alkyl (meth)acrylates or vinyl and allyl ethers of polyoxaalkylene diols.

5. Composition according to claim 3, wherein n is from 4 to 14.

6. Composition according to claim 3, wherein $R_1$ is methyl.

7. Composition according to claim 3, wherein the $C_6H_4$ and $C_6H_5$ groups are each independently unsubstituted or substituted by 1 to 3 methoxy groups.

8. Composition according to claim 5, wherein $R_1$ is methyl.

9. Composition according to claim 5, wherein the $C_6H_4$ and $C_6H_5$ groups are each independently unsubstituted or substituted by 1 to 3 methoxy groups.

10. Composition according to claim 6, wherein the $C_6H_4$ and $C_6H_5$ groups are each independently unsubstituted or substituted by 1 to 3 methoxy groups.

11. Composition according to claim 8, wherein the $C_6H_4$ and $C_6H_5$ groups are each independently unsubstituted or substituted by 1 to 3 methoxy groups.

12. A method of using a composition according to claim 1, comprising producing alignment layers with the composition on a substrate material.

* * * * *